US010217305B1

(12) United States Patent
Johnson et al.

(10) Patent No.: US 10,217,305 B1
(45) Date of Patent: Feb. 26, 2019

(54) HOME MONITORING SYSTEM TRIGGERED RULES

(71) Applicant: Alarm.com Incorporated, Tysons, VA (US)

(72) Inventors: Kyle Rankin Johnson, Arlington, VA (US); William Wireko Mensah, Tysons, VA (US)

(73) Assignee: Alarm.com Incorporated, Tysons, VA (US)

( * ) Notice: Subject to any disclaimer, the term of this patent is extended or adjusted under 35 U.S.C. 154(b) by 0 days.

(21) Appl. No.: 16/031,372

(22) Filed: Jul. 10, 2018

Related U.S. Application Data

(63) Continuation of application No. 15/787,070, filed on Oct. 18, 2017, now Pat. No. 10,043,331, which is a continuation of application No. 15/235,749, filed on Aug. 12, 2016, now Pat. No. 9,858,739.

(60) Provisional application No. 62/207,089, filed on Aug. 19, 2015.

(51) Int. Cl.
G07C 9/00 (2006.01)
H04W 4/80 (2018.01)
H04L 12/28 (2006.01)
H04W 4/021 (2018.01)
H04W 76/10 (2018.01)
H04W 84/12 (2009.01)
H04B 1/3827 (2015.01)

(52) U.S. Cl.
CPC ..... G07C 9/00309 (2013.01); G07C 9/00896 (2013.01); H04B 1/3833 (2013.01); H04L 12/2816 (2013.01); H04W 4/021 (2013.01); H04W 4/80 (2018.02); H04W 76/10 (2018.02); G07C 2009/00341 (2013.01); G07C 2009/00928 (2013.01); H04W 84/12 (2013.01)

(58) Field of Classification Search
None
See application file for complete search history.

(56) References Cited

U.S. PATENT DOCUMENTS

| 9,858,739 | B1 | 1/2018 | Johnson et al. |
| 10,043,331 | B1 | 8/2018 | Johnson et al. |
| 2005/0184857 | A1 | 8/2005 | Roatis |
| 2005/0210283 | A1 | 9/2005 | Kato |
| 2010/0297941 | A1 | 11/2010 | Doan |
| 2013/0015947 | A1 | 1/2013 | Best |
| 2013/0091537 | A1* | 4/2013 | Parla ................ G06F 21/00 726/1 |

(Continued)

Primary Examiner — Carlos Garcia
(74) Attorney, Agent, or Firm — Fish & Richardson P.C.

(57) ABSTRACT

In some implementations, a system can trigger an action to be performed at a property based on satisfaction of criteria related to location information and a connection status of a mobile computing device. Location information of the mobile computing device relative of a pre-defined geographic region including at least a portion of the property is initially obtained. A connection status of the mobile computing device for a short range wireless connection with a communication-enabled device within the property is then obtained. Criteria for an action at the property is then determined to be satisfied by the location information and the connection status of the mobile computing device. The action is finally triggered to be performed at the property in response to determining that criteria for the action is satisfied.

20 Claims, 7 Drawing Sheets

(56) References Cited

U.S. PATENT DOCUMENTS

| | | | |
|---|---|---|---|
| 2013/0201286 A1* | 8/2013 | Schockmel | G07C 9/00111 348/46 |
| 2013/0318217 A1 | 11/2013 | Imes | |
| 2014/0120905 A1 | 5/2014 | Kim | |
| 2014/0295786 A1 | 10/2014 | Maier | |
| 2015/0279130 A1* | 10/2015 | Robertson | G07C 9/00571 340/5.61 |
| 2015/0363745 A1 | 12/2015 | Hatch | |
| 2016/0163138 A1 | 6/2016 | Turner | |

\* cited by examiner

HOME MONITORING SYSTEM TRIGGERED RULES

CROSS-REFERENCE TO RELATED APPLICATIONS

This application is a continuation (and claims the benefit of priority under 35 USC § 120 of U.S. application Ser. No. 15/787,070, filed Oct. 18, 2017, now allowed, which is a continuation of U.S. application Ser. No. 15/235,749, filed Aug. 12, 2016, now U.S. Pat. No. 9,858,739, issued Jan. 2, 2018, which claims the benefit of U.S. Provisional Patent Application No. 62/207,089 filed on Aug. 19, 2015 and entitled HOME MONITORING SYSTEM TRIGGERED RULES. All of these prior applications are incorporated herein by reference in their entirety.

TECHNICAL FIELD

This disclosure relates to home monitoring technology.

BACKGROUND

Many people equip homes and businesses with alarm systems to provide increased security for their homes and businesses. Alarm systems may include control panels that a person may use to control operation of the alarm system and sensors that monitor for security breaches. In response to an alarm system detecting a security breach, the alarm system may generate an audible alert and, if the alarm system is monitored by a monitoring service, the alarm system may send electronic data to the monitoring service to alert the monitoring service of the security breach.

SUMMARY

Techniques are described for monitoring technology. For example, techniques are described for triggering actions by a home monitoring system.

Implementations of the described techniques may include hardware, a method or process implemented at least partially in hardware, or a computer-readable storage medium encoded with executable instructions that, when executed by a processor, perform operations.

The details of one or more implementations are set forth in the accompanying drawings and the description below. Other features will be apparent from the description and drawings.

DETAILED DESCRIPTION

Techniques are described for triggering actions by a home monitoring system. The home monitoring system may control devices within a property in response to wireless connection events within the property. A connection event may include a mobile device connecting with a wireless network or a mobile device disconnecting from a wireless network. For instance, data indicating a user crossing a geo-fence associated with the property may be paired with data indicating that a device has recently connected to a wireless network to trigger a particular action related to home automation. Actions may be triggered based on action rules that map combinations of particular connection events and geo-fence data to particular actions to be performed within the property.

In some implementations, action rule triggering may be based on whether a device has connected to a wireless network after crossing a geo-fence. For example, the action rule triggering process may include receiving an indication from a device that a user has crossed a geo-fence associated with a property, receiving an indication from the device that the device has established a connection with a wireless network within the property, determining that the connection is established for the first time after the user has crossed the geo-fence, and in response, triggering a rule causing an action to be performed by the home monitoring system, e.g., unlocking a front door.

Figure 1:
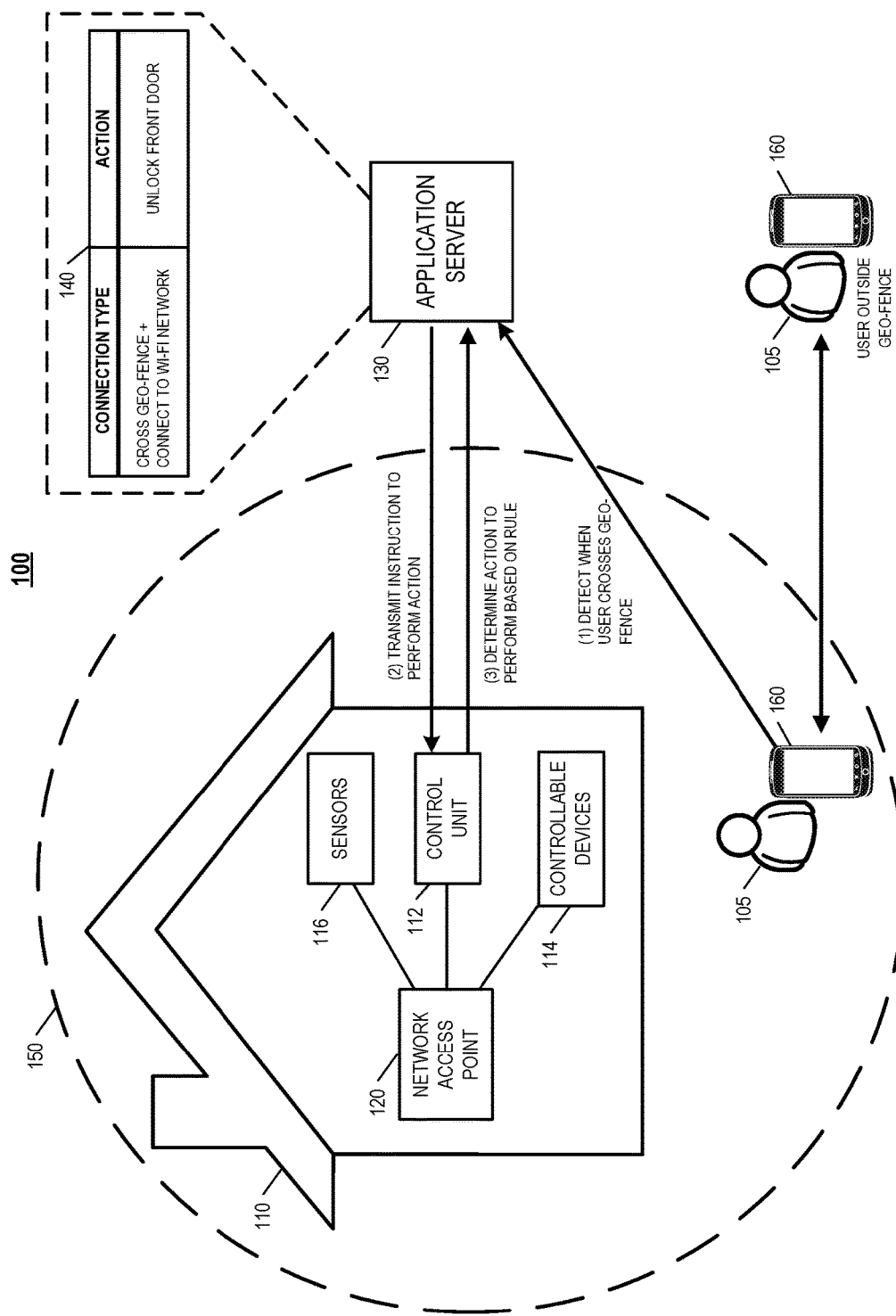
FIG. 1 illustrates an example of a system.

FIG. 1 illustrates an example of a home monitoring system 100. The home monitoring system 100 may include a property 110 (e.g., a home) of a user 105 that includes a control unit 112, controllable devices 114, and sensors 116. The home monitoring system 100 may also include a network access point 120, an application server 130 that includes an action rule repository 140, a geo-fence 150, and a mobile device 160 associated with the user 105.

The property 110 may include the control unit 112, the controllable devices 114, the sensors 116, and a wireless connection sensor 118, which exchange communications over the network access point 120. The controllable devices 114 may be electronic devices, for example, home automation devices such as connected lightbulbs, smart hubs, thermostats, or smart locks, which receive control signals from devices connected to the home monitoring system 100 such as the control unit 112 or the mobile device 160.

The control unit 112 may communicate over a short-range wired or wireless connection with each of the controllable devices 114 and the sensors 116 to receive connectivity data descriptive of events detected by the controllable devices 114. The control unit 112 may also communicate over a long-range wired or wireless connection with the application server 130.

In some implementations, the control unit 112 may define the configuration settings of the geo-fence 150. For instance, the control unit 112 may define the center of the geo-fence 150 within the property 110, the radius of the geo-fence 150 boundaries, and particular devices that trigger the geo-fence 150. In some instances, the control unit 112 may adjust the configuration settings of the geo-fence 150 based on user activity data. For example, if user activity data indicate particular time periods where the user is more likely to be occupying a particular location of the property, the control unit 112 may accordingly adjust the geo-fence 150 settings based on the user data indicating user occupancy. For example, the control unit 112 may adjust the center of the geo-fence 150 to be the backyard based on historical data indicating that the user may enter the property 110 from the backyard entrance during a particular period of time.

The property 110 also includes the network access point 120. For example, the network access point 120 may be a home wireless router, a beacon, or some other type of network connectivity device. The network access point 120 may enable the control unit 112, the controllable devices 114, or the sensors 116 to an establish network connection over a local area network (LAN) or wide area networks (WAN) such as the Internet.

The network access point 120 may additionally or alternatively provide a network for the control unit 112, the controllable devices 114, or the sensors 116 to exchange communications. The network may include communications for the network access point 120 to transmit over a public connection and/or communications requesting indications from the Network access point 120 if Internet access is available. The network may include, for example, one or more of the Internet, Wide Area Networks (WANs), Local Area Networks (LANs), e.g., Wi-Fi, analog or digital wired and wireless telephone networks, e.g., a public switched telephone network (PSTN), Integrated Services Digital Network (ISDN), a cellular network, and Digital Subscriber Line (DSL), Ethernet, Internet Protocol (IP) over broadband, radio, television, cable, satellite, Personal Area Networks (PANs), e.g., network connections without connecting over the Internet, or any other delivery or tunneling mechanism for carrying data. The network may include multiple networks or subnetworks, each of which may include, for example, a wired or wireless data pathway. The network may also include a circuit-switched network, a packet-switched data network, or any other network able to carry electronic communications (e.g., data or voice communications). For example, the network may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network may include one or more networks that include wireless data channels and wireless voice channels. The network may also be a wireless network, a broadband network, or a combination of networks including a wireless network and a broadband network.

The controllable devices 114 may be devices within the property 110 such as smart electronic devices, or home appliances that are capable of exchanging communications with the control unit 112. For example, controllable devices 114 may include garage openers, door locking devices, window opening devices, HVAC units, and other devices. The controllable devices 114 may receive signals from the control unit 112 that control the operations of the controllable devices 114 in response to the application server 130 determining that the criteria for a particular action rule has been satisfied. For example, the control unit 112 may transmit a signal to a door locking device to unlock the front door in response to the criteria of an action rule being satisfied.

The sensors 116 may be configured to sense objects within the property 110. For example, the sensors 116 may be motion sensors, light sensors, activity sensors, temperature sensors, or other types of sensing devices that measure a measurable parameter. The sensors 116 may exchange communications with control unit 112 using the network access point 120 to transmit the measured data. In one example, the sensors 116 may provide information to control unit 112 indicating that motion is detected in the property 110.

The application server 130 may manage the operations of the home monitoring system 100, as well as other (and, perhaps, many more) home monitoring systems for various properties. The application server 130 may receive, from the control unit 112, sensor data measured by the sensors 116 included in the property 110, and from the mobile device 160, a notification indicating when the user 105 crosses the geo-fence 150, the direction of movement, and indicating when the mobile device 160 connects to a wireless network provided by the network access point 120. In some implementations, the application server 130 may additionally or alternatively receive information indicating whether the mobile device 160 is within the geo-fence 150 boundaries (e.g., inside or outside the boundaries), or information including a connection history between the mobile device 160 and the network access point 120.

The application server 130 may include an action rule repository 140. The action rule repository 140 may be a database structure stored on the application server 130 that defines particular actions to be performed by controllable devices 114 of the of the property 110 based on a mapping between particular connection events to particular actions. For instance, the action rule repository 140 may include action rules that define (i) triggering conditions that specify particular connection events and (ii) instructions to be transmitted by the application server 130 to the control unit 112 to perform particular actions in response to satisfaction of the triggering conditions specified by particular connection events.

The action rules included in the action rule repository 140 may specify home automation actions such as, for example, locking and unlocking doors, opening or closing features of the property 110 (e.g., windows, doors, etc.), adjusting appliance settings within the property (e.g., turning lights on and off, adjusting thermostat settings, or HVAC settings).

In some implementations, application server 130 may monitor connection events. For instance, the application server 130 may monitor incoming connections from the mobile device 160 to the network access point 120 or incoming Bluetooth pairing requests to Bluetooth-enabled devices. For example, the application server 130 may log information related to a connection established between the mobile device 160 and the network access point 120 within the property 110. In another example, the application server 130 may log information related to a Bluetooth pairing event from the mobile device 160 and a car Bluetooth. In such examples, the application server 130 may track connection and disconnections with the network access point 120, and/or Bluetooth pairing and Bluetooth un-pairings between the mobile device 160 and other devices.

In response to detecting connection events within the property 110, the application server 130 may determine whether the criteria of the action rules are satisfied to trigger an action to be performed in response to the connection event. If the criteria of the action rules are not satisfied, the application server 130 may ignore the connection event. For example, the application server 130 may ignore multiple Wi-Fi reconnection attempts by the mobile device 160 if they take place after a specified time period after the mobile device 160 crosses the geo-fence 150 (e.g., within five minutes of crossing the geo-fence 150). Alternatively, in another example, in response to an initial Wi-Fi connection attempt after two minutes of crossing the geo-fence 150, the application server 130 may trigger a particular action, which is specified by an action rule associated with a Wi-Fi connection attempt. In such an example, the application server 130 may transmit instructions to control unit 112 to perform the particular action in response to a connection event.

In other examples, the application server 130 may use user activity data determined from sensor data measured by the sensors 116 to determine if the criteria of an action rule are satisfied. For instance, the motion data from motion sensors may be used to determine if a user 105 is presently located within the property 110 or within a specified distance from the property 110 to satisfy the criteria for an action rule. For example, if a connection event takes place within the geo-fence 150, but motion sensor data indicates that no one is presently located outside the ten feet radius specified by the action rule, the application server 130 may determine that the criteria of the action rule is not satisfied, and in response, ignore the connection event.

In some implementations, the application server 130 may perform an additional processing operation to determine if performing the action may be useful to the user 105 after determining that the action rule criteria is satisfied. For instance, in response to determining that the action may not be useful to the user 105, the application server 130 may not trigger the action to be performed even though the criteria of the action rules are satisfied. In such instances, data from various contexts may be combined to make inferences on whether the action to be triggered may be useful to the user 105. For example, if the front door of the property 110 is already unlocked, and the mobile device 160 connects to the network access point 120, an action rule that specifies unlocking the front door may be ignored because the application server 130 may determine that performing the action (e.g., unlocking the front door) may be redundant given the current configuration of the front door.

In some implementations, the criteria to satisfy a particular application rule may additionally include determining whether the user is the first person to enter the property 110. For instance, in response to the detecting that the mobile device 160 has crossed the geo-fence 150 and connected to the network access point 120, the application server 130 may then determine, based on sensor data detected by the sensors 116 transmitted from the control unit 112, if another user is presently within the property 110. In such instances, if the application server 130 determines that another user is presently within the property 110, the application server 130 may determine that criteria for the action rule is not satisfied, and in response, ignore the action rule. For example, if another user is currently in the property 110 when the user 105 crosses the geo-fence 150 and the mobile device 160 connects to the network access point 120, the application server may ignore an action rule that specifies adjusting the thermostat to a particular temperature based on determining that the other user is within the property 110.

The geo-fence 150 may be a dynamically generated virtual boundary, configured by the control unit 112, with a particular radius (e.g., one mile) surrounding the property 110. The control unit 112 may exchange communications with a location-based mapping application on the application server 130 that determines when particular location-aware devices such as, for example, the mobile device 160, enter or exit the virtual boundary of a geo-fence 150. Additionally, or alternatively, the control unit 112 may transmit a notification indicating that location of the user 105 relative to the boundaries of a geo-fence 150 to the mapping application on the application server 130 based on determining that the mobile device 160 has crossed the geo-fence 150. For example, in one instance, when the mobile device 160 enters the geo-fence 150 boundaries, the control unit 112 may transmit a corresponding signal to the application server 130 indicating that the user has crossed into a geo-fence 150. In another instance, when the mobile device 160 exits the geo-fence 150 boundaries, the control unit 112 may transmit another signal to the application server 130 indicating that the user has exited a geo-fence 150. Additionally, or alternatively, the application server 130 may receive geographic locations from the mobile device 160 and designations of geo-fenced areas by the user, and determine when the mobile device 160 enters or leaves the geo-fenced areas based on the received geographic locations. Additionally, or alternatively, the mobile device 160 may receive designations of geo-fenced areas, and notify the application server 130 when the mobile device 160 enters or leaves geo-fenced areas.

In some implementations, data indicating that the user has crossed the virtual boundary may be collected by different location-aware devices (e.g., the mobile device 160 and a GPS-enabled smart watch) that are each associated with the user 105. In such implementations, data collected by the different devices may be compared and/or cross-referenced to reduce the likelihood of incorrectly triggering an action rule. For example, if the user 105 crosses the boundary specified by the geo-fence 150 when the mobile device 150 is powered off, then when the mobile device 160 is powered on and connects to the network 105, the system may disregard the recent connection event in triggering in an action rule such as unlocking the front door of the property 101. In this example, GPS data from the smart watch may be used to determine the actual time point when the user 105 crossed the boundary specified by the geo-fence 150. This time point may then be compared against the time point when the mobile device 160 connects to the local network to determine that the connect event actually took place after the user 105 has entered the property 110 when the action rule is no longer relevant.

In some implementations, the geo-fence 150 may be enabled by a separate component within the system 100 such as, for example, a proximity detection beacon that determines when the mobile device 160 enters the boundaries of the geo-fence 150. In such implementations, the proximity beacon may be set up to exchange communications with the mobile device 160 and the control unit 112 using the network access point 120. For example, the proximity detection beacon may initially detect when the mobile device 160 enters or exits the geo-fence 150 and in response, transmit a signal to the control unit 112, which then relays the signal to the application server 130.

In some implementations, the property 110 may include multiple geo-fences 150 for different locations within the property 110. For instance, the property 110 may include one geo-fence 150 that monitors user activity near a front door, another geo-fence 150 that monitors user activity near the back door, and third geo-fence 150 that monitors user activity near the garage door. In such instances, the multiple geo-fences may be paired with different connection events within the action rule repository 140. For example, the geo-fence 150 near the garage door may be paired with a connection event with a car Bluetooth to trigger a garage door open action, whereas the geo-fence 150 near the front door may be paired with a connection event with the mobile device 160 connecting to the network access point 120 to trigger a front door open action.

In some implementations, the geo-fence 150 activity may be additionally or alternatively paired with sensor data generated by the sensors 116 and connection event data to trigger actions to be performed. For instance, the control unit 112 may transmit video monitoring or motion detection data within the property 110 to the application server 130 and in response, the application server 130 may use the sensor data in relation to the connection events to determine if an action should be triggered. For example, the criteria for satisfying an action rule that opens the garage door so that a user may park their car inside the garage may include the user 105 crossing the geo-fence 150, a connection event between the mobile device 160 and the network access point 120, and video data indicating that the user's car is pulling into a driveway. Alternatively, if the video data indicates that the user is walking from the sidewalk to the front door along the driveway, then in response, the application server 130 may determine that the criteria for the action rule is not satisfied even though the user 105 may have crossed the geo-fence 150 and the connection event between the mobile device 160 and the network access point 120 took place because the video data does not indicate that the user's car is pulling into the driveway. In this example, the application server 130 may instead trigger another action of unlocking a front door.

In some implementations, the geo-fence 150 activity may be simultaneously paired with Bluetooth connection activity and Wi-Fi connection activity. For instance, Bluetooth connections and wireless connections to the network access point 120 may create different criteria for triggering performance of particular actions. In such instances, the different connection events may include various configuration settings for individual Bluetooth connections, individual Wi-Fi connections, and combinations of Bluetooth and Wi-Fi connections to the network access point 120. For example, in one instance, the application server 130 may determine that the mobile device 160 is in a geo-fenced area, is connected to the network access point 120, and connects to a Bluetooth of a car, and in response, instructs a garage door to open.

The mobile device 160 may be a device that hosts one or more native applications. The mobile device 160 may be a cellular phone or a non-cellular locally networked device. The mobile device 160 may include a cell phone, a smart phone, a tablet PC, a personal digital assistant ("PDA"), or any other portable device configured to communicate over a network. For example, implementations also may include electronic organizers, portable music players, communication devices, handheld or portable electronic devices for gaming, communications, and/or data organization. The mobile device 160 may be the same or may include mobile devices of different types. The mobile device 160 may perform functions unrelated to the system 100, such as placing personal telephone calls, playing music, playing video, displaying pictures, browsing the Internet, maintaining an electronic calendar, etc.

In some implementations, the mobile device 160 may be able to determine a geographic location associated with the user 105 and may communicate information identifying a geographic location associated with the user 105. For example, a mobile device 160 may determine the current geographic location of the mobile device 160 by using global positioning system (GPS) capabilities. In other implementations, a geographic location associated with the user 105 may be determined using other methods, for example, by using Wi-Fi access point triangulation data, cellular network triangulation data, or IP address information, when the mobile device 160 has network connectivity. The mobile device 160 may then transmit data identifying the geographic location of the user 105 to the application server 130.

The mobile device 160 may include a native application. The native application refers to a software/firmware program running on the mobile device 160 that enables the various features. For example, the mobile device 160 may load or install the native application based on data received over a network or data received from local media. The native monitoring application may run on mobile devices' platforms, such as Apple iOS, iPhone, iPod touch, Blackberry, Google Android, Windows Mobile, etc.

The native application identifies a geographic location associated with the mobile device 160 and communicates information identifying the geographic location. For example, a mobile device 160 having the native application may determine a geographic location of the mobile device 160 using GPS capabilities, and may communicate data identifying the geographic location to the application server 130. In some instances, the native application may check the location of the mobile device 160 periodically and may automatically detect when a user associated with the mobile device 160 is going toward or away from a property. In some instances, the native application may receive an indication that the application server 130 is interested in connection events with the network access point, determine that the connection event is between the network access point 120 which is of interest, and transmit a signal including information related to the connection event to the application server 130. The native application may receive information related to the geo-fence 150 and transmit information to the application server 130 in response to determining when the user 105 is entering or exiting the geo-fence 150. In some implementations, the native application may additionally or alternatively transmit information related to a connection event or geo-fence activity to the control unit 112 and in response, the control unit 112 may transmit the information to the application server 130.

In some implementations, the native application may display an interface on the screen of the mobile device 160 that includes a notification that a rule action has been triggered by the application server 130. In some instances, the interface may include options for a user to provide an input confirming the action or an instruction to cancel the action. For example, in response to determining that the criteria for a rule that opens the front door, the native application may present a notification to the user confirming whether the user wants to open door. In such an example, the user may either confirm the action, which then may be transmitted by the application server 130 to the control unit 112 to relay the signal to the controllable device 114 that controls the operation of the door, or the user may cancel the action, which then instructs the application server 130 not to transmit the signal to perform the action.

In the example represented in FIG. 1, the application server 130 may detect when the user 105 crosses the geo-fence 150 associated with the property 110 based on location data generated by the mobile device 160. The application server 130 may then determine that the user 105 is within the geo-fence 150 boundaries and in response, access the action rule repository 140 to determine the appropriate action to perform, and then transmit an instruction for the appropriate action to the control unit 112. In some implementations, the application server 130 may detect when the user 105 crosses the geo-fence 150 associated with the property 110 based on location data generated by the mobile device 160. The application server 130 may then determine that the user 105 is within the geo-fence 150 boundaries and in response, transmit an instruction to the control unit 112 to perform a particular action. In response to receiving the instruction, the control unit 112 may transmit a signal to the application server 130 to access the action rule repository 140 to determine the appropriate action to perform. In other implementations, the action rule repository 140 may additionally or alternatively be stored on the control unit 112. In such implementations, the application server 130 may transmit a geo-fence crossing indication to the control unit 112, and the control unit 112 may then determine the particular action to be performed based on a locally-stored action rule repository 140 within the property 110. In another example, the application server 130 may transmit an instruction to the control unit 112 indicating that a particular rule is satisfied, and the control unit 112 may access the locally-stored action rule repository 140 to determine the actions to perform associated with the satisfied rule.

In some implementations, the application server 130 may receive data indicating connections and disconnections to the network access point 120 and data from the mobile device 160 indicating when the user 105 enters and exits the geo-fence boundaries to determine whether to perform a particular action in response to the connection type specified in action rule repository 140. In some instances, the application server 130 may track the order of connection events over the network access point 120 to determine if the particular action should be performed. For example, as shown in the example in FIG. 1, the application server 130 may require the user to initially cross the geo-fence 150 prior to connecting to the network access point 120 to transmit an instruction to perform an action to the control unit 112. In other instances, the application server 130 may track the time difference between multiple connection events to determine if an action should be performed. For example, if the mobile device 160 connects to the network access point 120 after a threshold time period (e.g., one hour) after the user crosses the geo-fence 150, the application server 130 may determine that the connection events indicate that the mobile device 160 may be reconnecting to the network access point 120 and in response, ignore the connection events and not transmit an instruction to perform an action to the control unit 112.

In some implementations, the home monitoring system 100 may additionally include Bluetooth beacons within the property 110. In such implementations, the Bluetooth beacons may be used to track connection events of Bluetooth devices within the property 110. For instance, Bluetooth pairing between Bluetooth devices and the Bluetooth beacons may be monitored by the control unit 112 to determine whether particular actions should be triggered. In one example, connection events between Bluetooth devices and the Bluetooth beacons may be used to trigger actions related to adjusting HVAC operations within the property 110.

Figure 2:
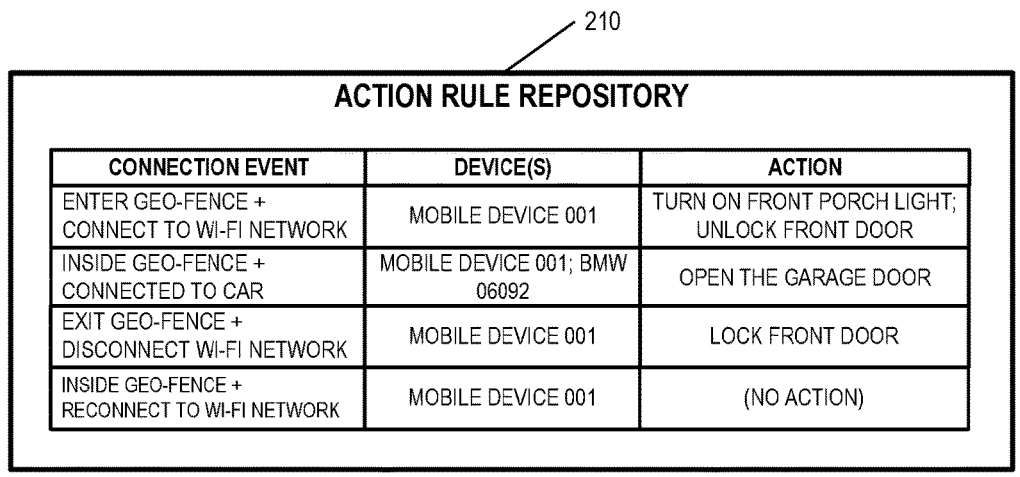
FIG. 2 illustrates an example of an action rule repository.

FIG. 2 illustrates an example action rule repository 210. For instance, the action rule repository 210 may specify the criteria for particular connection events, triggered actions to be performed in response to the criteria being satisfied, and devices that are impacted by the action to be performed. As shown in the examples in FIG. 2, the criteria for connection event may include the mobile device 160 entering the boundaries specified by the geo-fence 150 and the mobile device 001 (e.g., the mobile device 160) connecting to the Wi-Fi network within the property 110 using the network access point 120. The corresponding action to be performed may be the application server 130 transmitting a signal to the control unit 112 to turn on the front porch light and unlock the front door.

In another example, the criteria for the connection event may be defined by the location of the user 105 in relation to the boundaries of the geo-fence 150. For instance, in the second example in FIG. 2, the criteria may include the mobile device 160 being presently located within the geo-fence 150 and the mobile device 160 connecting to a car's Bluetooth. In response to the criteria for the action rule being satisfied, the application server 130 may transmit an instruction to the control unit 112 to control a controllable device 114, e.g., opening a garage door.

In yet another example, the criteria for the connection event may be defined by the user exiting the boundaries specified by the geo-fence 150. For instance, in the third example in FIG. 2, the criteria may include the mobile device 160 exiting the geo-fence 150 and the mobile device 001 (e.g., the mobile device 160) disconnecting from the network access point 120. In response to the criteria being satisfied, the application server 130 may transmit an instruction to the control unit 112 to lock the front door. In such an example, the user activity (e.g., exiting the property 110 vicinity and being outside the connection radius of the wireless network) indicates that the user 105 is leaving the property 110.

In yet another example, the action rule repository 210 may specify no action to be performed in response to particular criteria for the connection event. For instance, in the fourth example in FIG. 2, the criteria may include the mobile device 160 being inside the boundaries of the geo-fence 150 and the mobile device 001 (e.g., the mobile device 160) reconnecting to the Wi-Fi network using the network access point 120. In such an example, the application server 130 perform no action in response to the mobile device 160 reconnecting to the Wi-Fi network.

Figure 3:
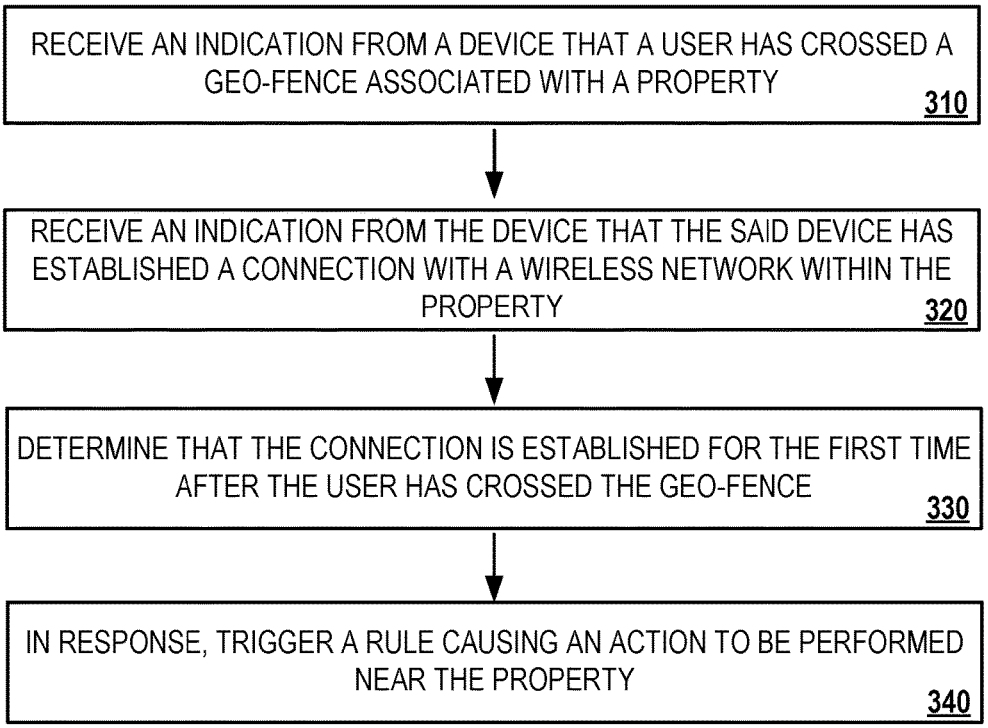
FIG. 3 illustrates an example of a process for triggering actions by a home monitoring system in response to establishing of a wireless connection.

FIG. 3 illustrates an example process 300 for triggering actions by a home monitoring system in response to establishing of a wireless connection. Briefly, the process 300 may include receiving an indication from a device that a user has crossed a geo-fence associated with a property (310), receiving an indication from the device that the device has established a connection with a wireless network within the property (320), determining that the connection is established for the first time after the user has crossed the geo-fence (330), and in response, triggering a rule causing an action to be performed near the property (340).

In more detail, the process 300 may include receiving an indication from a device that a user has crossed a geo-fence associated with a property (310). For example, the application server 130 may receive an indication from the mobile device 160 that the mobile device 160 has crossed the boundaries of the geo-fence 150 of the property 110. Detecting that the mobile device 160 has crossed the boundaries of the geo-fence is determined based on location data of the mobile device 160 and configuration settings of the geo-fence 150. In some instances, the mobile device 160 crossing the boundaries of the geo-fence 150 may additionally or alternatively be determined by the control unit 112 within the property 110 or the application server 130. For example, the control unit 112 may exchange communications with the mobile device 160 after crossing the boundaries of the geo-fence 150 and in response, determine that the mobile device 160 is within the boundaries of the geo-fence 150.

The process 300 may include receiving an indication from the device that said device has established a connection with a wireless network within the property (320). For example, the application server 130 may receive an indication from the mobile device 160 after the mobile device 160 establishes a connection with the network access point 120. In some instances, the connection may include connecting to a Wi-Fi network within the property 110. As discussed above, the application server 130 may additionally or alternatively trigger actions based on established Bluetooth connections instead of wireless network connections.

The process 300 may include determining that the connection is established for the first time after the user has crossed the geo-fence (330). For example, the application server 130 may compare data included in the received indication from the mobile device 160 against historical data that includes previously logged connections or activity logs indicating when the mobile device 160 was previously detected crossing the geo-fence 150 that are stored within a repository. For instance, to determine if the mobile device 160 has connected with the network access point 120 for the first time after crossing the geo-fence 150, the application server 130 may compare a timestamp indicating when the mobile device 160 connects with the network access point 120 to a timestamp of the previously detected geo-fence 150 crossing and a timestamp of the previous instance of a connection event. In such instances, if the comparison indicates that there have been no previous instances of connection events after the last detected geo-fence 150 crossing, then the application server 130 determines that the mobile device 160 has established a connection with the network access point 120 for the first time after the last detected geo-fence 150 crossing.

The process 300 may include triggering a rule causing an action to be performed near the property (340). For example, in response to determining that the criteria for an action rule being satisfied by the connection event, the application server 130 may transmit an instruction to the control unit 112 that includes triggering an action to be performed within or near the property 110.

In some instances, the application server 130 may initially determine the action to be performed based on comparing the particular connection event against the action rule repository 140 to determine a particular action to be performed. The application server 130 may then transmit an instruction including the particular action to the control unit 112. In some instances, the application server 130 may determine that the particular action is requesting the control unit 112 for additional sensor information, the control unit 112 may in response provide the additional sensor information to the application server 130, and the application server 130 may then determine another action to perform based on the particular connection event and the additional sensor information, and transmit an instruction to the control unit 112 to perform the other action.

Figure 4A:
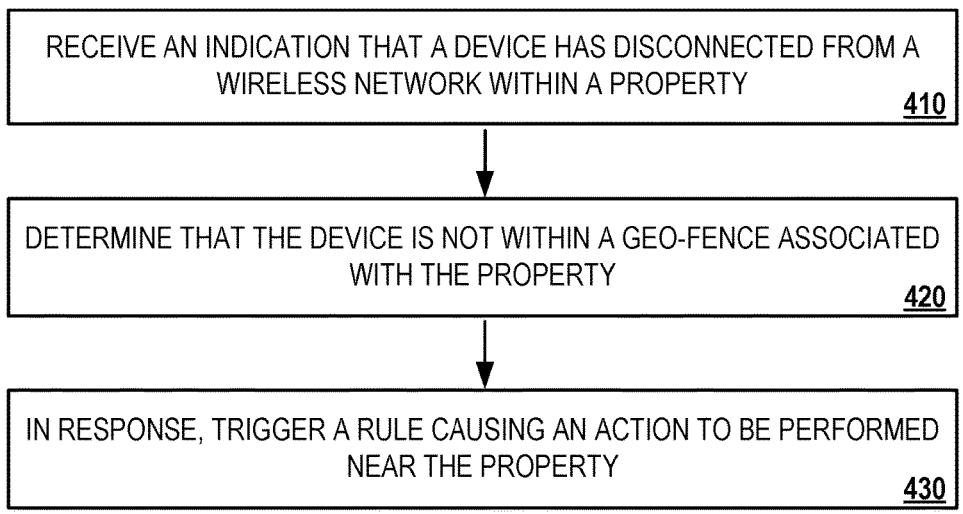
FIGS. 4A-B illustrate examples of processes for triggering actions by a home monitoring system in response to disconnections.

FIG. 4A illustrates an example process 400A for triggering actions by a home monitoring system in response to disconnection of a wireless connection. Briefly, the process 400A may include receiving an indication that a device has disconnected from a wireless network within a property (410), determining that the device is not within a geo-fence associated with the property (420), and in response, trigger a rule causing an action to be performed near the property (430).

In more detail, the process 400A may include receiving an indication that a device has disconnected from a wireless network within a property (410). For example, the application server 130 may receive an indication from the mobile device 160 after the mobile device 160 disconnects from the network access point 120. In some instances, the connection may include disconnection from a Wi-Fi network within the property 110.

The process 400A may include determining that the device is not within a geo-fence associated with the property (420). For example, the application server 130 may receive an indication that the mobile device 160 has exited the boundaries of the geo-fence 150 of the property 110 and in response, determine that the mobile device 160 is no longer within the boundaries specified by the geo-fence 150. In some instances, the application server 130 may additionally or alternatively determine that the mobile device 160 has exited the boundaries and not re-entered for a particular time period (e.g., fifteen minutes) prior to determining that the mobile device 160 is not located within the boundaries of the geo-fence 150. For example, if the mobile device 160 crosses the boundaries of the geo-fence 150, then the application server 130 determines that the mobile device 160 is still located within the boundaries of the geo-fence 150 until the particular time period has elapsed and the mobile device 160 has still not re-entered the geo-fence 150. In another example, if the mobile device 160 crosses the boundaries of the geo-fence 150 and does not re-enter for two hours, the application server 130 may determine that the mobile device 160 is not within the boundaries of the geo-fence 150 after fifteen minutes has passed from when the mobile device 160 crosses the geo-fence 150.

The process 400A may trigger a rule causing an action to be performed (430). For example, in response to determining that the mobile device 160 is not within the boundaries specified by the geo-fence 150 associated with the property 110, the application server 130 may trigger an action rule that causes a particular action to be performed near or within the property 110. For example, the application server 130 may transmit an instruction to the control unit 112 to lock the front door based on determining that the mobile device 160 has disconnected from the network access point 120 and is not within the boundaries of the geo-fence 150 satisfies the criteria of an action rule for locking the front door of the property 110.

Figure 4B:
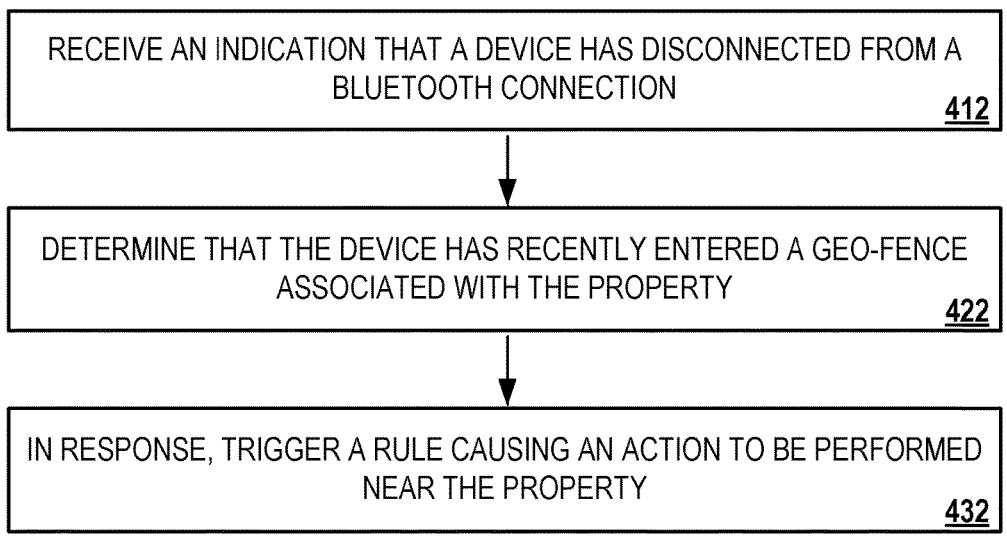

FIG. 4B illustrates an example process 400B for triggering actions by a home monitoring system in response to disconnection of a Bluetooth connection. Briefly, the process 400B may include receiving an indication that a device has disconnected from a Bluetooth connection (412), determining that the device has recently entered a geo-fence associated with the property (422), and in response, trigger a rule causing an action to be performed near the property (432).

In more detail, the process 400B may include receiving an indication that a device has disconnected from a Bluetooth connection (412). For example, the application server 130 may receive an indication from the mobile device 160 after the mobile device 160 disconnects from a car Bluetooth device.

The process 400B may include determining that the device has recently entered a geo-fence associated with the property (422). For example, the application server 130 may receive from the mobile device 160 an indication that the mobile device 160 has recently entered the boundaries of the geo-fence 150 of the property 110 or determine that the application server 130 recently received an indication that the mobile device entered the boundaries of the geo-fence 150. In some instances, the application server 130 may compare a timestamp associated with the mobile device 160 disconnecting from the Bluetooth connection and another timestamp associated with the mobile device 160 entering the boundaries of the geo-fence 150 of the property 110 and determine if the time period between the respective timestamps is below a particular threshold time period (e.g., five minutes). For example, if the Bluetooth disconnection event takes place within the threshold time period of crossing the geo-fence 150, then the application server 130 may determine that mobile device has recently entered the geo-fence 150.

The process 400B may include triggering a rule causing an action to be performed near the property (432). For example, in response to determining that mobile device 160 has recently entered the geo-fence 150 associated with the property 110, the application server 140 may determine that criteria for a particular action rule has been satisfied and trigger actions of the action rule. The application server 130 may trigger the action rule if the mobile device 160 has recently crossed the geo-fence to prevent inadvertently performing an action that may not be desired by the user 105. For instance, the application server 130 may unlock the front door of the property 110 when the mobile device 160 disconnects from a car Bluetooth device, but only if the mobile device 160 has recently entered the boundaries of the geo-fence 150.

Figure 5:
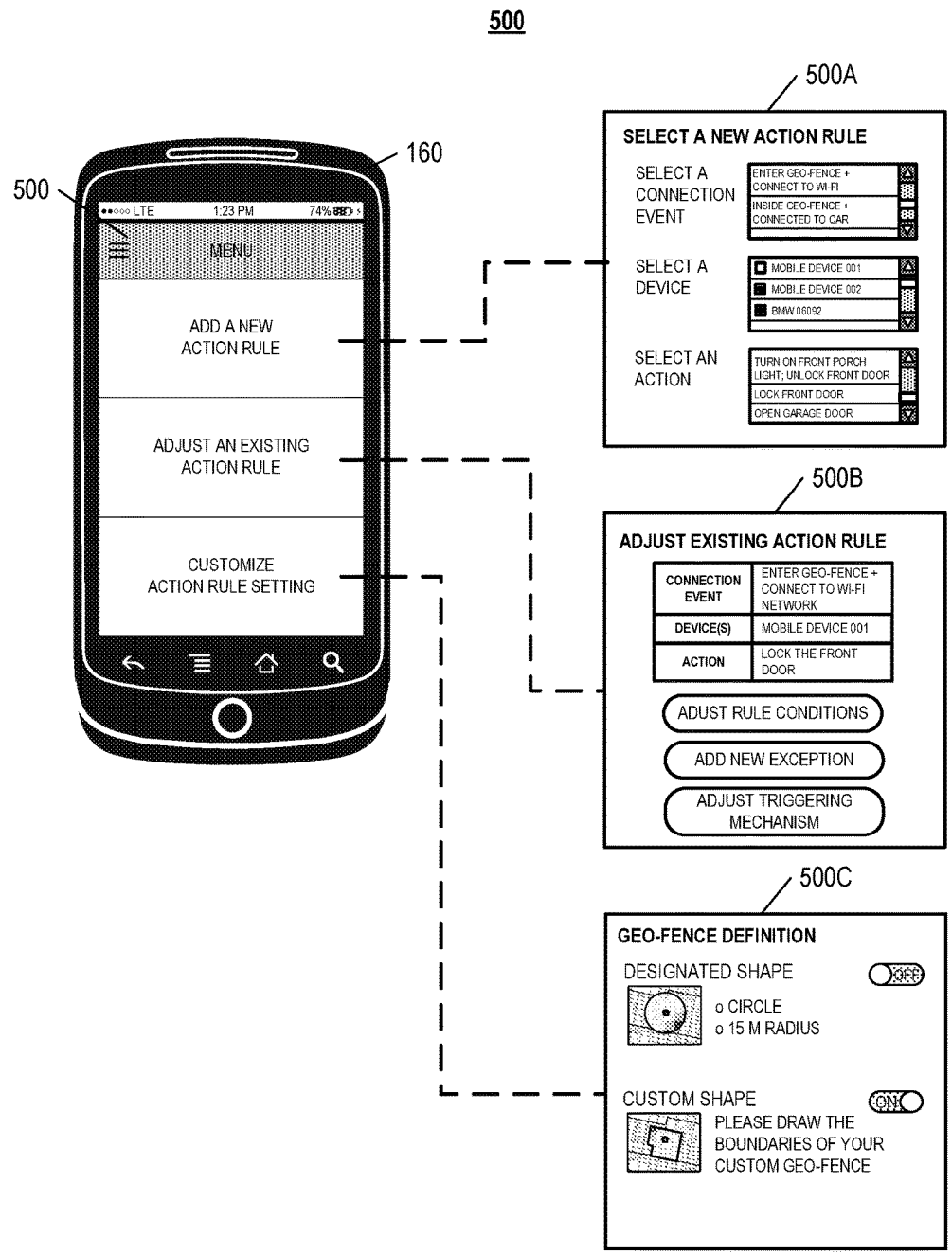
FIG. 5 illustrates an example of a user interface for configuring action rules.

FIG. 5 illustrates an example of a user interface 500 for configuring action rules. The interface 500 includes pages 500A, 500B, and 500C that may be used by the user 105 to provide input to configure the action rules that are performed by the home monitoring system 100. For instance, the page 500A enables the user 105 to define and/or customize a new action rule. The page 500B enables the user 105 to adjust an existing action rule, and page 500C enables the user 105 to define the boundaries specified by the geo-fence 150. While pages 500A-C are described as pages, the pages 500A-C may also be provided in the form of pop-up windows or other user interface elements.

The interface 500 may be provided to the user 105 in various ways. In some implementations, the interface 500 may be provided on a mobile application executed on the mobile device 160. In such implementations, the mobile application may be used to enable data communications between the mobile device 160 and the application server 130 as described previously with respect to FIG. 1. In other implementations, the interface 500 may be provided as a webpage that is accessed through a browser application on the mobile device 160, or another network enabled electronic device. The input provided by the user 105 on the interface 500 may be used to update existing definitions of action rules that are included within the action rule repository 140 and/or process other types of changes to the action rule repository 140 (e.g., adding a new action rule, deleting an existing action rule, etc.).

Referring initially to page 500A, the user 105 may select criteria for a connection event, an action to be performed in response to the occurrence of the connection event, and one or more devices for which associated information is evaluated to determine if the connection event has taken place. As described above, criteria for a connection event may be associated with the mobile device 160 (e.g., entering into the area specified by the geo-fence 150 and then connecting to the Wi-Fi network within the property 100). As an example, criteria for a connection event may specify location information of the mobile device 160 relative to the geo-fence 150 such that the application server 130 may determine when the mobile device 160 enters into the area enclosed by the geo-fence 150 and/or when the mobile device 160 exits the area. The location information may also specify how long the mobile device 160 has remained within or remained outside the area relative to the most recent time point when the mobile device 160 crossed the geo-fence 150. Accordingly, the mobile device 160 may conserve memory space by not storing geo-fence information. Additionally, or alternatively, the mobile device 160 may store data defining the geo-fence and when the mobile device 160 determines that the mobile device 160 has crossed the geo-fence based on the stored data, provide location information to the application server 130 that indicates that the mobile device 160 has crossed the geo-fence and a direction that the geo-fence was crossed. Accordingly, location information updates from the mobile device 160 to the application server 130 may be reduced to instances where a geo-fence is crossed, potentially saving processing, bandwidth, and power of both the mobile device 160 and the application server 130.

In another example, the criteria for the connection event may specify a connection status of the mobile device 160 with another communication-enabled device within or nearby the property. In some instances, the connection status refers to a connection with a Bluetooth device (e.g., a Bluetooth-enabled vehicle). In other instances, the connect status refers to a connection to a local area network within the property 100 (e.g., a wireless network associated with the network 105). The connection status may indicate one or more of a connection from a particular device or network or a disconnection from a particular device or network.

The user 105 may also specify one or more devices for which associated information is used to determine whether a connection event has taken place. For instance, if the user 105 selects the mobile device 160 as the device specified by the action rule, then location information and connection status of the mobile device 160 may be used to determine if a connection event has taken place as described above. In another instance, the user may select one or more connection events and one or more actions, and also select one or more devices for which association information is monitored to determine whether the connection event has taken place to trigger the action.

Although not depicted within the page 500A, in some implementations, the user 105 may also select multiple devices to be specified by an action rule. For instance, as described previously with respect to FIG. 2, an action rule may include multiple devices that are each associated with a specific connection event (e.g., the mobile device 160 entering an area specified by the geo-fence 150, and a car communication module disconnecting from a Bluetooth connection with the mobile device 160). In this example, the action is triggered by the satisfaction of two connection events that are individually associated with two devices.

In some implementations, the user 105 may also select additional specifications for an action rule. For instance, the user 105 may select devices to perform a specified action. In such instances, the user 105 may either select a device from among a list of devices that have been previously associated with the home monitoring system 100, or add a new device that is within a communication range with the mobile device 160. The user 105 may also specify multiple devices to perform a specified action. Each of the selected devices may perform the same action, or one or more actions that are specifically designated to each device. For example, in response to a satisfaction of a connection event, the user 105 may specify the mobile device 160 to establish communications with a local network within the property 100, and the control unit 112 to transmit an instruction to close the garage door.

Referring now to page 500B, the user 105 may also adjust an existing action rule that is included within the action rule repository 140. For instance, the user 105 may adjust conditions associated with an action rule definition (e.g., criteria for the connection event, the action to be performed, and/or the device). For example, the user 105 may adjust the location information associated with a connection event such that the mobile device 160 must remain within the area specified by the geo-fence 150 for a longer period of time before the connection event is determined to be satisfied.

The user 105 may also add exceptions to the action rule. For instance, the user 105 may specify specific conditions where the home monitoring system 100 may not perform the specified action rule even if the connection event has taken place. For example, the user 105 may specify an exception time period during which the occurrence of connection events do not cause the home monitoring system 100 to perform the specified action. In another example, the exceptions may be used to prevent the home monitoring system 100 from performing the specified action if the user 105 has recently entered and exited the geo-fence 150 in a short period of time.

The user 105 may also adjust the triggering mechanism for the action rule. For example, the user 105 may prioritize different action rules within the action rule repository 140 so that if multiple connection events have taken place to trigger multiple action rules within a single instance, the home monitoring system 100 may use the prioritization to only execute a subset of the actions to be performed (e.g., performing the action of only the highest priority system action) or determine an order to execute actions. In another example, the user 105 may specify a set of exemptions that prevent the triggering of a system action to be performed as described above.

Referring now to page 500C, the user 105 may adjust and/or customize settings related to actions to be performed according to the action rules. For instance, the user 105 may adjust configurations of the geo-fence 150 that impact to the satisfaction of the criteria for connection events specified by an action rule. In one example, the user 105 may adjust the size of the area specified by a predetermined shape of the geo-fence 150. In another example, the user 105 may provide an input on a map that defines a custom shape surrounding the location of the property 100. In this example, the user 105 may customize the shape of the geo-fence 150 around landmarks and/or regions of interest that surround the location of the property 100.

In some implementations, the action rules may be used to adjust settings of the mobile device 160 in response to occurrence of a specified connection event. For example, in response to detecting that the mobile device 160 has entered into the area defined by the geo-fence 150, location services (e.g., GPS data) of the mobile device 160 may be disabled to conserve battery life because the mobile device 160 may instead use a local network within the property 100 for determining a location of the mobile device 160.

Figure 6:
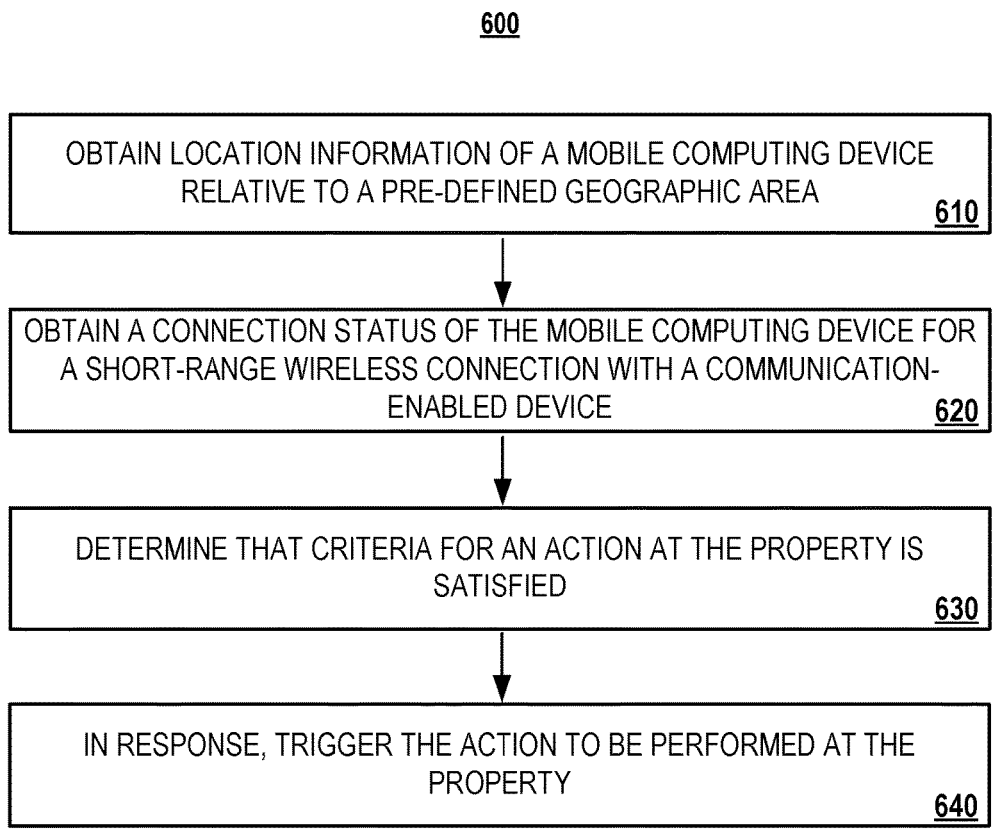
FIG. 6 illustrates an example of a process for triggering actions by a home monitoring system based on location information and connection status of a mobile computing device.

FIG. 6 illustrates an example of a process 600 for triggering actions by a home monitoring system based on location information and connection status of a mobile computing device. Briefly, the process 600 may include obtaining location information of a mobile computing device relative to a pre-defined geographic area (610), obtaining a connection status of the mobile computing device for a short-range wireless connection with a communication-enabled device (620), determining that criteria for an action at the property is satisfied (630), and in response, triggering the action to be performed at the property (640).

In general, the process 600 may either be executed by the application server 130, the mobile device 160, or a combination of the two. For instance, in some implementations where the application server 130 executes the process 600, the data associated with the mobile device 160 (e.g., location information and/or connection status) may be transmitted to the application server 130 by the mobile device 160 without the mobile device 160 storing information regarding action rules, geo-fences, or connections to monitor, e.g., every minute, five minutes, hour, or whenever there is a change in location of connections, thereby potentially saving memory of the mobile device 160. In such implementations, the application server 130 may process the data transmitted by the mobile device 160 and identify portions of the data that are relevant to the action rules included within the action rule repository. In other implementations where the application server 130 executes the process 600, the application server 130 may indicate to the mobile device 160 the geo-fences and the connections that the mobile device 160 should provide location information and connection status on, and when the mobile device 160 determines there is a change that matches the indicated geo-fences and connections, provide the location information and connection status reflecting the change.

In other implementations where the mobile device 160 executes the process 600, the mobile device 160 may locally store the action rule repository 140 and transmit instructions directly to control unit 112 or directly to devices of the home monitoring system 100 without exchanging data communications with the application server 130. In this regard, the mobile device 160 may be capable of transmitting instructions to perform the action rules using other short-range wireless communication methods (e.g., Bluetooth, near-field communication) without necessarily having network connectivity to the application server 130. In yet another implementation where the mobile device 160 executes the process 600, the mobile device 160 may locally store the action rule repository 140 and transmit instructions to the application server 130 to then forward to a control unit 112. Accordingly, the mobile device 160 may avoid providing location information and connection status to the application server 130, reducing the amount of power and processing needed to transmit the location information and connection status.

In more detail, the process 600 may include obtaining location information of a mobile computing device relative to a pre-defined geographic area (610). For instance, the application server 130 may obtain location information of the mobile device 169 relative to a pre-defined geographic region defined by the geo-fence 150. As described above, the geographic region may include at least a portion of the property 100. For instance, the geo-fence 150 may enclose the entire property (e.g., having an area that exceeds the area of the property), or enclose a portion of the property that is of interest (e.g., including a front door of the property but not the backyard). The location information of the mobile device 130 may indicate whether and when the mobile device 130 has recently entered or exited the geographic area defined by the geo-fence 150, and/or a time period that the mobile device 130 has remained within or outside a geo-fence.

In some implementations, the mobile device 160 may obtain the location information instead of the application server 130. In such implementations, the mobile device 160 may store data defining the geo-fence 150 and when the mobile device 160 determines that the mobile device 160 has crossed the geo-fence 150 based on the stored data and a current sensed location of the mobile device 160, provides location information to the application server 130 that indicates that the mobile device 160 has crossed the geo-fence and a direction that the geo-fence 150 was crossed. Accordingly, location information updates from the mobile device 160 to the application server 130 may be reduced to instances where a geo-fence is crossed, potentially saving processing, bandwidth, and power of both the mobile device 160 and the application server 130.

The process 600 may include obtaining a connection status of the mobile computing device for a short-range wireless connection with a communication-enabled device (620). For instance, the application server 130 may obtain a connection status of the mobile device 160 for a short-range wireless connection with a communication-enabled device within the property 100. As described above, the short-range wireless connection may be a wireless connection with a Bluetooth-enabled device or a connection to a local area network within the property 100. The communication-enabled device may be a Bluetooth-capable device that can be paired with the mobile device 160 (e.g., a car connectivity kit, a Bluetooth-enabled speaker device), or a wireless router of the local area network within the property 100.

The process 600 may include determining that criteria for an action at the property is satisfied (630). For instance, the application server 130 may determine that criteria for a connection event specified by an action rule is satisfied by the location information and the connection status of the mobile device 160. As described above with respect to FIG. 5, the criteria for the connection event may be defined by a set of conditions submitted by the user 105 (e.g., the mobile device 160 entering into an area defined by the geo-fence 150 and disconnecting from a Bluetooth connectivity car kit). Although in this example, the criteria for the connection event is based on the local information and the connection status of the mobile device 160, in other examples, the criteria for the connection event may be based on the local information and/or the connection status of multiple devices as described above.

The process 600 may include triggering the action to be performed at the property in response to determining that criteria for an action at the property is satisfied (640). For instance, in response to determining that criteria for the action at the property 100 is satisfied, the application server 130 may trigger the action to be performed at the property 100. As described above with respect to FIG. 1, the application server 130 may transmit an instruction to the control unit 112 to perform an action specified by one or more action rules whose connection events have been satisfied.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed application-specific integrated circuits (ASICs).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A computer implemented method comprising:
   obtaining location information of a mobile computing device relative to a pre-defined geographic area including at least a portion of a property;
   obtaining a connection status of the mobile computing device for a short range wireless connection with a communication-enabled device within the property;
   obtaining, from one or more motion sensors associated with the property, motion data indicative of motion at the property;
   determining that criteria for an action at the property is satisfied by
      (i) the location information of the mobile computing device relative to the pre-defined geographic area including at least the portion of a property;
      (ii) the connection status of the mobile computing device for the short range wireless connection with the communication-enabled device within the property; and
      (iii) the motion data indicative of motion at the property; and
   in response to determining that criteria for the action at the property is satisfied, triggering the action to be performed at the property, wherein the action to be performed at the property is one or more of:
   unlocking a door;
   locking a door;
   opening a door;
   closing a door;
   opening a window;
   closing a window;
   opening a garage door;
   closing a garage door;
   adjusting appliance settings;
   turning on a light; and
   turning off a light.

2. The method of claim 1, wherein the motion data comprises presence data indicating a presence or an absence of a person within the property or within a preset distance from the property.

3. The method of claim 2, wherein the presence data further indicates a presence or an absence of a person within a preset distance from the property.

4. The method of claim 2, wherein determining that criteria for an action at the property is satisfied comprises:
   determining that a person is present within the property.

5. The method of claim 2, wherein determining that criteria for an action at the property is satisfied comprises:
   determining that a person is not present within the property.

6. The method of claim 2, further comprising:
   determining that the criteria for an action at the property has not been satisfied based on the absence of a person within the property.

7. The method of claim 2, further comprising:
determining that the criteria for an action at the property has not been satisfied based on the presence of a person within the property.

8. The method of claim 1, wherein the location information of the mobile computing device comprises at least one or more of:
data indicating that the mobile computing device has entered the pre-defined geographic area,
data indicating that the mobile computing device has left the pre-defined geographic area,
data indicating that the mobile computing device is presently located within the pre-defined geographic area, or
data indicating that the mobile computing device is located outside the pre-defined geographic area.

9. The method of claim 1, wherein the connection status of the mobile computing device indicates that the mobile computing device has either connected to a wireless local network within the portion of the property, or disconnected from the wireless local network within the portion of the property.

10. The method of claim 1, wherein the connection status of the mobile computing device indicates that the mobile computing device has either established a Bluetooth connection with a particular device associated with the property, or disconnected from a Bluetooth connection with the particular device associated with the property.

11. The method of claim 1, wherein:
the location information of the mobile computing device comprises data indicating that the mobile computing device has entered the pre-defined geographic area,
the connection status of the mobile computing device indicates that the mobile computing device has connected to a wireless local network within the portion of the property; and
triggering the action to be performed at the property comprises transmitting an instruction to unlock a door of the property.

12. The method of claim 1, wherein:
the location information of the mobile computing device comprises data indicating that the mobile computing device has left the pre-defined geographic area,
the connection status of the mobile computing device indicates that the mobile computing device has disconnected from a wireless local network within the portion of the property; and
triggering the action to be performed at the property comprises transmitting an instruction to lock a door of the property.

13. The method of claim 1, wherein:
the location information of the mobile computing device comprises data indicating that the mobile computing device is presently located within the pre-defined geographic area,
the connection status of the mobile computing device indicates that the mobile computing device has connected to a wireless local network within the portion of the property; and
triggering the action to be performed at the property comprises transmitting an instruction to unlock a door of the property.

14. The method of claim 1, wherein:
the location information of the mobile computing device comprises data indicating that the mobile computing device is presently located within the pre-defined geographic area,
the connection status of the mobile computing device indicates that the mobile computing device has recently established a Bluetooth connection with a communication-enabled device associated with a vehicle nearby the property, and
triggering the action to be performed at the property comprises transmitting an instruction to open a garage door of the property.

15. The method of claim 1, wherein:
the location information of the mobile computing device comprises data indicating that the mobile computing device is presently located within the pre-defined geographic area,
the connection status of the mobile computing device indicates that the mobile computing device has recently disconnected from a Bluetooth connection with a communication-enabled device associated with a vehicle nearby the property, and
triggering the action to be performed at the property comprises transmitting an instruction to close a garage door of the property.

16. The method of claim 1, further comprising:
determining that the criteria for an action at the property has not been satisfied by the location information of the mobile computing device relative to the pre-defined geographic area including at least the portion of a property, and the connection status of the mobile computing device for the short range wireless connection with the communication-enabled device within the property; and
wherein:
the location information of the mobile computing device comprises data indicating that the mobile computing device is presently located within the pre-defined geographic area,
the connection status of the mobile computing device indicates that the mobile computing device has recently disconnected from a wireless local network within the portion of the property.

17. A system comprising:
one or more computers; and
one or more storage devices storing instructions that, when executed by the one or more computers, cause the one or more computers to perform operations comprising:
obtaining location information of a mobile computing device relative to a pre-defined geographic area including at least a portion of a property;
obtaining a connection status of the mobile computing device for a short range wireless connection with a communication-enabled device within the property;
obtaining, from one or more motion sensors associated with the property, motion data indicative of motion at the property;
determining that criteria for an action at the property is satisfied by
(i) the location information of the mobile computing device relative to the pre-defined geographic area including at least the portion of a property;
(ii) the connection status of the mobile computing device for the short range wireless connection with the communication-enabled device within the property; and
(iii) the motion data indicative of motion at the property; and
in response to determining that criteria for the action at the property is satisfied, triggering the action to be performed at the property, wherein the action to be performed at the property is one or more of:
unlocking a door;
locking a door;
opening a door;
closing a door;
opening a window;
closing a window;
opening a garage door;
closing a garage door;
adjusting appliance settings;
turning on a light; and
turning off a light.

18. The system of claim 17, wherein the motion data comprises presence data indicating a presence or an absence of a person within the property or within a preset distance from the property.

19. A non-transitory computer-readable storage device encoded with computer program instructions that, when executed by one or more computers, cause the one or more computers to perform operations comprising:
obtaining location information of a mobile computing device relative to a pre-defined geographic area including at least a portion of a property;
obtaining a connection status of the mobile computing device for a short range wireless connection with a communication-enabled device within the property;
obtaining, from one or more motion sensors associated with the property, motion data indicative of motion at the property;
determining that criteria for an action at the property is satisfied by
(i) the location information of the mobile computing device relative to the pre-defined geographic area including at least the portion of a property;
(ii) the connection status of the mobile computing device for the short range wireless connection with the communication-enabled device within the property; and
(iii) the motion data indicative of motion at the property; and
in response to determining that criteria for the action at the property is satisfied, triggering the action to be performed at the property, wherein the action to be performed at the property is one or more of:
unlocking a door;
locking a door;
opening a door;
closing a door;
opening a window;
closing a window;
opening a garage door;
closing a garage door;
adjusting appliance settings;
turning on a light; and
turning off a light.

20. The non-transitory computer-readable storage device of claim 19, wherein the motion data comprises presence data indicating a presence or an absence of a person within the property or within a preset distance from the property.

* * * * *